July 9, 1957  J. E. JENDRISAK  2,798,338
GLASS BENDING APPARATUS
Filed March 10, 1953  2 Sheets-Sheet 1
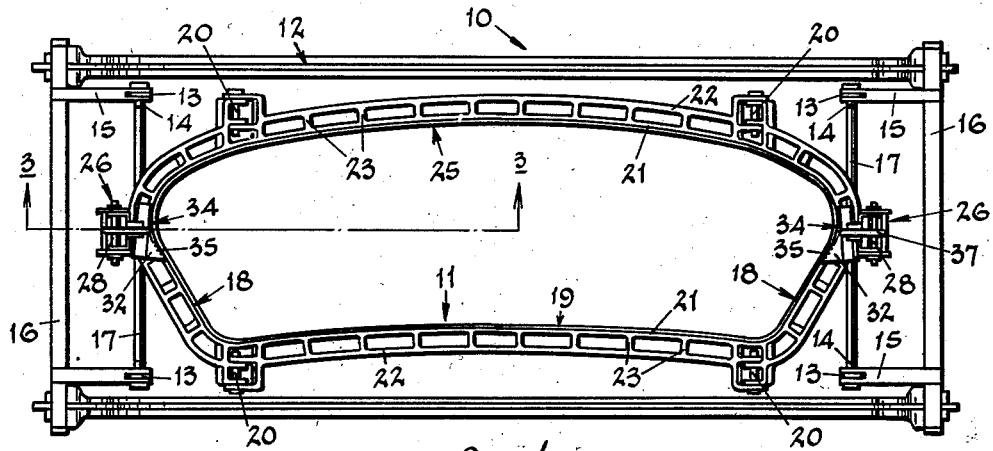
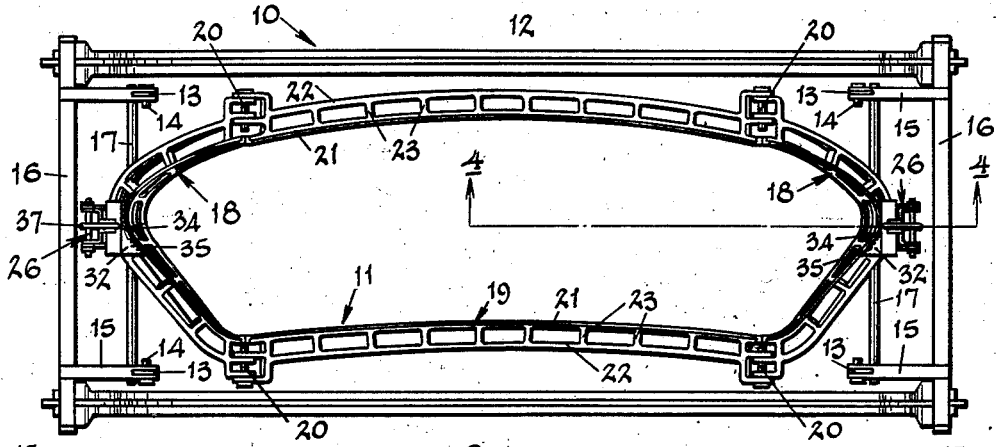
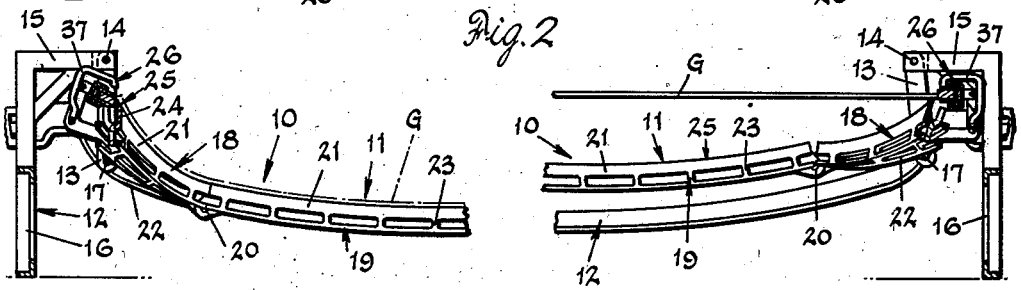
Inventor
Joseph E. Jendrisak
By Nobbe & Swope
Attorneys July 9, 1957     J. E. JENDRISAK     2,798,338
GLASS BENDING APPARATUS Filed March 10, 1953     2 Sheets-Sheet 2

Inventor
Joseph E. Jendrisak
By Nobbe & Swope
Attorneys

United States Patent Office 2,798,338
Patented July 9, 1957

2,798,338

GLASS BENDING APPARATUS

Joseph E. Jendrisak, Northville, Mich., assignor to Libbey-Owens-Ford Glass Company, Toledo, Ohio, a corporation of Ohio Application March 10, 1953, Serial No. 341,540

7 Claims. (Cl. 49—67)

This invention relates broadly to apparatus for bending glass sheets or plates. More particularly, it relates to an improved means for locating and retaining glass sheets in proper relation to a mold during the bending operation.

Although the locating and retaining means of this invention is of general utility with apparatus for bending glass sheets under the influence of heat and gravity into conformity with a mold of the desired curvature, it has been found especially well adapted to so-called hinged type molds and is described and illustrated in connection therewith. However, it is to be understood that its utility extends to any bending apparatus in which a glass sheet, in being bent into conformity with the mold, undergoes the general changes in position to be hereinafter described.

Hinged type molds are made up of a plurality of sections, each of which is provided at its upper edge with a portion of the complete shaping surface of the mold. The sections are hinged together in such a manner as to permit them to be moved from a closed position, in which the shaping surface conforms to the desired curvature of a glass sheet to be bent, to an open position, in which the sections are extended and spread apart to receive and properly locate a flat sheet above said shaping surface.

It is particularly necessary with molds of this type to provide means for locating the glass sheet in proper relation above the mold and to retain it in this relation during the major portion of the actual bending operation. It has been proposed to so locate and retain the glass sheet by providing means at the ends of the mold for engaging the adjacent end edges of the glass sheet during the bending thereof from a flat to a bent shape.

It is frequently necessary, in the bending of flat glass sheets to irregular shapes, such as the one herein illustrated, to cause the end portions of the sheet to undergo a significant change with respect to the side portions. That is, as the end and side portions are lowered onto the mold, the end portions are caused to simultaneously change in angular relation to said side portions. Due to this constantly changing angular relation, increased difficulty is encountered in retaining the sheet in its properly located position with respect to the mold.

According to this invention then, there is provided at each end of the bending mold, a sheet edge locating and retaining means which is mounted adjacent the shaping surface of the mold and universally movable with respect thereto in order to retain said edge in proper bending relation to said shaping surface, at all times during the actual bending operation, by adapting its movement to that of said edge.

It is therefore an object of this invention to provide an improved apparatus for bending glass sheets into conformity with a mold shaping surface of the desired curvature whereby a glass sheet is at all times during the actual bending operation located and retained in proper relation to said shaping surface.

Another object of this invention is to provide an improved bending mold which is provided with means at each end thereof for properly locating and retaining the end edges of a glass sheet in proper relation to the shaping surface of the mold during the bending of the sheet into conformity therewith.

Still another object of this invention is to provide an improved sheet edge locating and retaining means of the type described which is adapted to conform to and move with said edge as the glass sheet is bent into conformity with the mold shaping surface.

Still another object of this invention is to provide an improved sheet edge locating and retaining means of the type described which is mounted on the mold adjacent the shaping surface thereof and universally movable with respect thereto.

Other objects and advantages of the invention will become more apparent during the course of the following description when taken in connection with the accompanying drawings.

In the drawings, wherein like numerals are employed to designate like parts throughout the same:

Fig. 1 is a plan view of a hinged type bending mold apparatus in the closed position with the sheet edge locating and retaining means of this invention associated therewith;

Fig. 2 is a plan view of the apparatus and associated locating and retaining means in the open position;

Fig. 3 is a longitudinal sectional view of a portion of the apparatus and locating and retaining means in the closed position and taken substantially along line 3—3 of Fig. 1;

Fig. 4 is a longitudinal sectional view of a portion of the apparatus and locating and retaining means in the open position and taken substantially along line 4—4 of Fig. 2;

Figure 5:
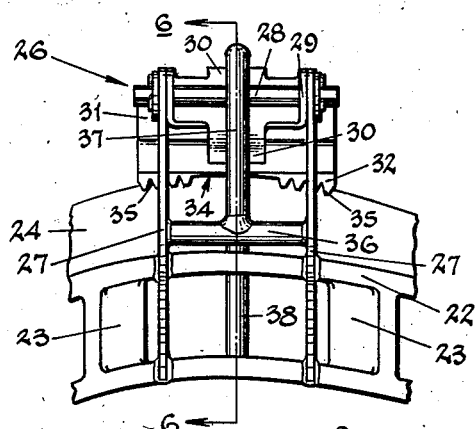
Fig. 5 is an enlarged rear view of the locating and retaining means.

Referring now to the drawings, there is shown in Figs. 1 to 4, a hinged type bending mold apparatus, designated in its entirety by the numeral 10, to which the use of the improved sheet edge locating and retaining means of this invention is particularly well adapted. This apparatus comprises a mold 11 which is pivotally carried by and suspended from a rigid frame 12 by means of links 13 that are arranged toward the corners of the mold. The links 13 are pivotally connected at their upper ends by pins 14 to bars 15 extending inwardly from end supports 16 of frame 12. Extending transversely of the mold 11 at each end thereof and journaled in the lower ends of the links 13 are rods 17 to which end sections 18 of the mold may be secured in any suitable manner.

Each of the end sections 18 conforms in plan to the desired outline of the bent glass sheet at the extreme ends and converging side portions thereof. The inwardly disposed end faces of said end sections are hingedly connected to the adjacent end faces of a center section 19 of the mold by means of pins 20.

End and center sections 18 and 19 of the mold are formed of castings of open framework design to provide maximum strength with a minimum of material. Each section comprises inner and outer rails 21 and 22, respectively, connected at intervals in proper spaced relation by cross webs 23. Projecting upwardly from the top of inner rail 21 on each of the sections is an extension 24 which is tapered at its upper end to form a narrow shaping surface 25. In the closed position of the mold (Figs. 1 and 3), the inner end faces of the rails of the end sections 18 are adapted to abut against those of the corresponding rails of the center section 19 to define substantially continuous inner and outer rings. Thus, when the mold is closed, the inner ring provides a continuous, narrow shaping surface 25 which conforms to the desired outline and curvature of a glass sheet when bent into conformity therewith.

When a flat glass sheet G is to be placed in position to be bent, the sections of the mold 11 may be moved to the open, glass-receiving position (Figs. 2 and 4). That is, end sections 18 are swung outwardly on supporting links 13 which in turn raises center section 19 by means of the connecting pins 20. In this manner, the length of the mold 11 may be extended an amount sufficient to accommodate the length of glass sheet G.

The novel locating and retaining means of this invention, designated in their entirety by the numeral 26, are disposed at and secured to each end of the mold such that the end edges of the glass sheet G may be placed therebetween to hold the mold in the open position, as best shown in Fig. 4. Thus, the flat sheet acts as a strut in bearing at both ends against the locating and retaining means 26 to positively and properly locate said sheet in proper bending relation to the shaping surface 25 of the mold and to hold said mold in the open, glass-receiving position, as aforenoted.

As well, the marginal edge portions of the ends of the glass sheet rest upon the adjacent end portions of the shaping surface. As the sheet is subjected to heat, it softens and bends, under the combined influence of gravity and the end pressure exerted by the locating and retaining means 26, into conformity with the closed mold (Fig. 3). During the actual bending operation, as the mold moves from the open to the closed position, the sheet is at all times maintained in proper location with respect to the mold by the locating and retaining means. However, as the sheet settles into conformity with the shaping surface 25 of the closed mold, it pulls away a slight distance from the locating and retaining means, which then drops out of sheet edge locating and retaining position (as shown in Fig. 3) so as to avoid unnecessary strains in the finally bent glass sheet.

As the mold 11 moves from the open, glass-receiving position of Fig. 2 to the closed position of Fig. 1, the ends of the glass sheet are caused to undergo substantial movement. That is, as the flat sheet is bent to an irregular shape, its end portions are not only swung downwardly in a vertical plane but are also more or less twisted or turned in a horizontal plane. To better illustrate the movement above described, if a flat rectangular sheet were being bent to a substantially cylindrical shape, the end portions thereof would move only in the so-called vertical plane and would not be twisted or turned in the so-called horizontal plane. From a comparison of the relative positions of the locating and retaining means 26 of the open mold (Fig. 2) with those of the closed mold (Fig. 1), however, it can be seen that as the glass sheet is bent to an irregular shape, said end portions are twisted or turned in said horizontal plane.

In order to properly locate and retain the sheet with relation to the mold at all times during the actual bending operation and to avoid unnecessary stresses and strains in the sheet as it undergoes the movements aforenoted, the locating and retaining means 26 of this invention embodies a novel construction whereby it may move in any direction with the end edges of the sheet located and retained thereby. That is, by means of the novel construction of this invention, the locating and retaining means is adapted to move universally under the influence of the glass sheet edge abutting thereagainst.

Figure 6:
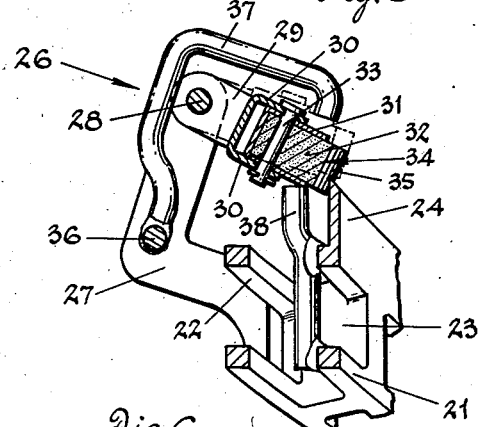
Fig. 6 is a transverse sectional view of the locating and retaining means taken substantially along the line 6—6 of Fig. 5.
Figure 7:
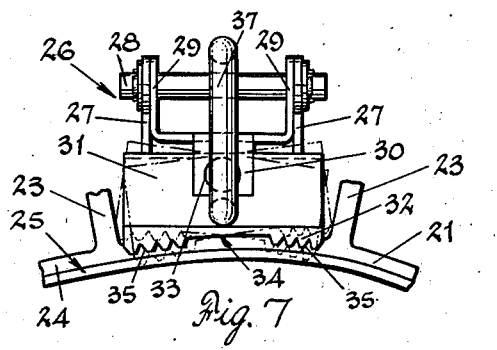
Fig. 7 is a top plan view of the locating and retaining means shown in Fig. 5.

Referring now specifically to the preferred construction of said locating and retaining means, it can be seen from Figs. 5 to 7 that a pair of substantially L-shaped supports 27 are secured to and project outwardly and upwardly from the extreme ends of outer rail 22 of each of the end sections 18 of the mold. Journaled in and extending between the upper ends of the arms is a rod 28 to which are secured the legs of a U-shaped coupling 29, the web of said coupling extending inwardly from the supports 27. Flanges on the web of the coupling are turned inwardly to form ears 30 for receiving the closed end of a channel-shaped bracket 31 in slightly spaced relation thereto.

The bracket 31 in turn receives a locator block 32 of Marinite or other suitable material which will not fuse under heat to the glass sheet G. The locator block, bracket and ears are secured to one another by a spindle 33, extending vertically through each. Thus, it can be seen that the inwardly disposed face 34 of locator block 32 may be moved universally with respect to shaping surface 25 of the mold. That is, it is movable vertically by pivotal movement of the coupling 29 on the rod 28, as shown by the phantom lines of Fig. 6, and horizontally on spindle 33, as shown by the phantom lines of Fig. 7. As can be seen from the latter figure, said horizontal movement is limited by the engagement of bracket 31 with the web of coupling 29 which is spaced slightly therefrom as aforenoted.

A portion of locator block 32 projects outwardly from bracket 31 and the face 34 thereof is preferably shaped to conform to the edges of the located and retained end portions of the glass sheet abutting thereagainst. Also, the face 34 of the locator block is spaced outwardly a slight distance from shaping surface 25 such that the marginal end edges of glass sheet G may be supported on said surface during the bending operation. Portions of said face may be serrated as at 35 in order to expose more of the end edge surfaces of the glass sheet to the tempering air of the furnace.

Extending upwardly and inwardly from a rod 36 secured between the elbows of L-shaped supports 27 is an arm 37. The inwardly disposed end of said arm is turned down and finished in such a manner as to provide an abutment for the top side of bracket 31. Thus, said arm provides a stop or limit for the vertical movement of the bracket and the locator block 32 in an upward direction. That is, when the mold 11 is moved to the open, glass-receiving position, said stop serves to properly position the locator block for receiving the end edges of a glass sheet G (Fig. 4).

The upper end of a rod 38 secured to inner rail 21 of each of the end sections of the mold serves as a stop for the bracket and locator block in a downward position, and is located so as to permit the locator block to retain the ends of the glass sheet in proper position with respect to the mold shaping surface until said sheet is finally bent into conformity therewith, and also to prevent said block from swinging against the other parts of the locating means.

It is to be understood that the form of the invention disclosed herein is to be taken as the preferred embodiment thereof, and that various changes in the shape, size and arrangement of parts may be resorted to without departing from the spirit of the invention or the scope of the following claims.

I claim:

1. In combination with a plurality of movably mounted mold sections movable into an open and a closed position and having a shaping surface upon which a glass sheet is adapted to be bent, means for locating and retaining the end edges of said sheet in proper relation to said shaping surface during movement of said sections from the open to the closed position comprising, supports mounted at each mold end section and extending outwardly and upwardly from the shaping surface thereof, coupling members extending inwardly from said supports and pivotally supported therefrom, and locator bars movably mounted on said coupling members for swinging movement in an arc of fixed radius in planes at an angle to the plane of movement of said coupling members and having faces adjacent said shaping surface in position to locate and retain said end edges of the glass sheet.

2. In combination with a plurality of movably mounted mold sections movable into an open and a closed position and having a shaping surface upon which a glass sheet is adapted to be bent, means for locating and retaining the end edges of said sheet in proper relation to said shaping surface during movement of said sections from the open to the closed position comprising supports mounted at each mold end section and extending outwardly and upwardly from the shaping surface thereof, coupling members extending inwardly from said supports and pivotally supported therefrom, and locator bars movably mounted on said coupling members for movement in planes at an angle to the plane of movement of said coupling members and having faces adjacent said shaping surface in position to locate and retain said end edges of the glass sheet, said locator bars being pivotally mounted with respect to the coupling members for movement in a plane perpendicular to the plane of the movement of said coupling members.

3. Locating and retaining means of the character defined in claim 2, in which means are provided for limiting movement of said coupling members and for limiting movement of said locator bars relative thereto.

4. Locating and retaining means of the character defined in claim 3, in which the faces of the locator bars conform to the curvature of the end edges of the glass sheet located and retained thereby and are vertically serrated to expose an additional portion of said end edges.

5. In combination with apparatus for bending glass sheets, a mold having a shaping surface upon which a glass sheet is adapted to be bent, means adjacent the shaping surface for locating and retaining said sheet in proper relation to said shaping surface during the bending operation, and means mounting said locating and retaining means for movement about two different axes arranged at substantially right angles to one another.

6. A mold of the character defined in claim 5 in which the locating and retaining means includes a locator block for engaging an edge of the glass sheet to be bent, and in which the glass contacting face of said block is vertically serrated to expose an additional portion of the sheet edge.

7. In combination with apparatus for bending glass sheets, a mold having a shaping surface upon which a glass sheet is adapted to be bent, means at an end of the shaping surface and adjacent thereto for locating and retaining an end of the sheet in proper relation to said shaping surface during the bending operation, a pivoted support member mounted at the end of the mold for movement toward and away from said shaping surface, and means mounting said locating and retaining means on said support member for swinging movement in an arc of fixed radius and in a plane at an angle to the plane of movement of said support member.

References Cited in the file of this patent
UNITED STATES PATENTS

| | | |
|---|---|---|
| 2,518,951 | Smith | Aug. 15, 1950 |
| 2,554,572 | Jendrisak | May 29, 1951 |
| 2,608,799 | Babcock | Sept. 2, 1952 |